United States Patent [19]
Dobrzelecki et al.

[11] 3,842,363
[45] Oct. 15, 1974

[54] CHEMICAL LASER NOZZLE SYSTEM

[75] Inventors: Arthur Dobrzelecki, Albuquerque, N. Mex.; Richard C. Buggeln, Montgomery, Ala.

[73] Assignee: The United States of America as represented by the Secretary of the United States Air Force, Washington, D.C.

[22] Filed: Oct. 24, 1972

[21] Appl. No.: 300,002

[52] U.S. Cl. ........ 331/94.5 G, 330/4.3, 331/94.5 P, 239/290, 331/94.5 D
[51] Int. Cl. ............................................. H01s 3/22
[58] Field of Search .................. 331/94.5; 330/4.3; 239/290

[56] References Cited
UNITED STATES PATENTS

| | | | |
|---|---|---|---|
| 3,671,882 | 9/1970 | Cool | 331/94.5 |
| 3,688,215 | 8/1972 | Spencer et al. | 331/94.5 |

*Primary Examiner*—John K. Corbin
*Assistant Examiner*—R. J. Webster
*Attorney, Agent, or Firm*—Harry A. Herbert, Jr.; Arsen Tashjian

[57] ABSTRACT

A novel laser nozzle system for use in any chemical laser in which a first gaseous reactant, a second gaseous reactant, and a diluent gas can be used. A preferred embodiment includes: a first nozzle which is dimensioned and is configured to induce and to promote the supersonic flow of the first gaseous reactant through the first nozzle; a second nozzle which is positioned downstream both from the first nozzle and from the supersonic flow of the first gaseous reactant, and which is dimensioned and is configured to continue the supersonic flow of the first gaseous reactant through the second nozzle; and, a plurality of hollow conduits which are disposed both in a transverse attitude to the second nozzle, and downstream of the second nozzle, with each conduit of the plurality having a first plurality of orifices. The conduits are preferably in the geometry of tubes having a horizontal cross section which is circular. In another embodiment, each of the conduits is compartmentalized and has a second plurality of orifices. The nozzle system is readily adaptable to meet the varying parametric requirements of different chemical lasers. In addition, the nozzle system is simple in structure; and, thereby, the nozzle system permits the low cost of manufacture of the system, and also the low cost of operation of the chemical laser in which it is used. Further, the nozzle system permits the cooling of the hollow conduits, and prevents the premature combustion of the gaseous reactants.

2 Claims, 3 Drawing Figures

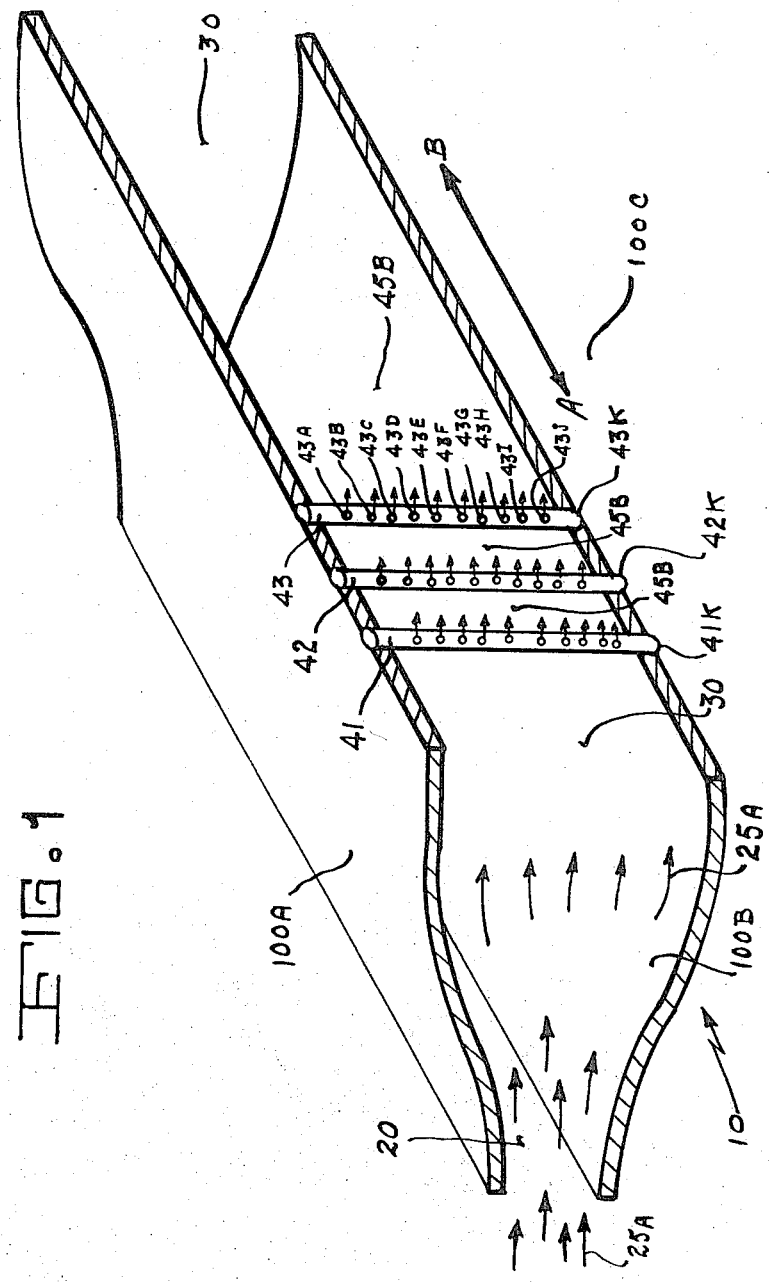

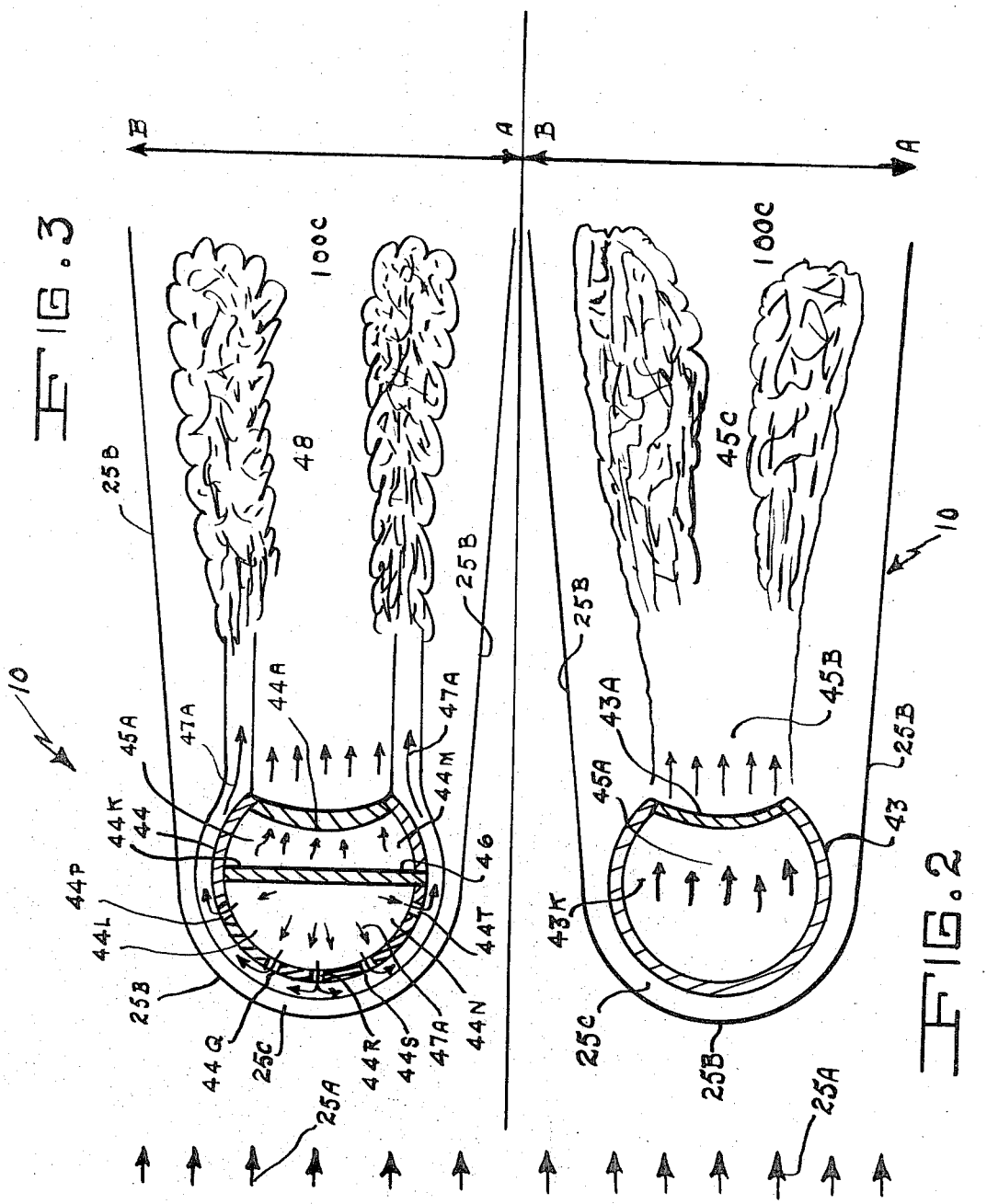

3,842,363

CHEMICAL LASER NOZZLE SYSTEM

BACKGROUND OF THE INVENTION

This invention relates to lasers and, more particularly, to chemical lasers and to a unique nozzle system for use therewith.

The phrase "chemical laser", or the like, as used herein is intended to mean a laser wherein the required population inversion is achieved directly by chemical reaction. In addition, the preferred embodiments, as described and shown hereinafter, are adaptations of our basic invention for use in a chemical laser wherein gaseous reactants and/or gaseous diluents are, or can be used.

It is fair and accurate to say that chemical lasers are not as well known as other lasers in the art; and, it is equally fair and accurate to state that, as a result of their comparatively recent advent and short existence, chemical lasers have not achieved the desired state of sophistication, multi-purpose utility, versatility, economy of manufacture and operation, and the like that, for example, the solid state lasers have attained. What is particularly needed, and is not presently available, is a nozzle system for a chemical laser, with said nozzle system capable of being adapted, by variation of the pertinent parameters by a person or ordinary skill in the art, to meet particular and specific needs or desires. For example, there is a pressing need for a nozzle system which will permit the effective and efficient mixing and "combustion" (i.e., chemical reaction) of the primary and secondary flows, respectively, of the gaseous reactants.

We have invented such an adaptable chemical laser nozzle system; and, by fulfilling the need for such a unique nozzle system, we have significantly advanced the state-of-the-art.

SUMMARY OF THE INVENTION

This invention pertains to a unique and novel nozzle system for a chemical laser.

The principal object of this invention is to provide a nozzle system which is readily adaptable to meet the varying parametric requirements of different chemical lasers.

Other objects are to simplify (and, thereby, to reduce the cost of) the manufacture and of the operation of the chemical laser in which our inventive nozzle system, or an adaptation thereof, is used.

These objects, and other equally important and related objects, of our invention will become readily apparent after a consideration of the description of our basic inventive system, coupled with reference to the drawings.

DESCRIPTION OF THE DRAWINGS

FIG. 1 is a side elevation view, in perspective, in schematic form, partially in cross section, and partially fragmented of a preferred embodiment of our invention;

FIG. 2 is a top plan view, in schematic form and in cross section, of a preferred embodiment of a major component of our invention, showing also its relative positional relationship; and FIG. 3 is also a top plan view, in schematic form and in cross section, of another embodiment of the major component shown in FIG. 2, and also showing its relative positional relationship.

DESCRIPTION OF THE PREFERRED EMBODIMENTS

A. General

With reference to FIG. 1, therein is shown, in a side elevation view, in perspective, in schematic form, partially in cross section, and partially fragmented, a preferred embodiment 10 of our basic inventive apparatus.

The preferred embodiment 10 comprises, essentially: a primary nozzle 20 (hereinafter referred to as the "first nozzle"); a secondary nozzle 30 (hereinafter referred to as the "second nozzle") positioned downstream of the first nozzle 20; and a plurality of hollow conduits, such as 41, 42 and 43 (hereinafter referred to as the "secondary nozzle conduits"), disposed downstream of the second nozzle 30, and also disposed in a transverse attitude to the second nozzle 30 (i.e., across the second nozzle 30).

First nozzle 20 is dimensioned and is configured to induce and to promote supersonic flow of a first gaseous reactant 25A, the directional flow of which is designated by arrows in FIG. 1. First nozzle 20 is defined and limited in part by the walls of the housing of the laser of which the nozzle system 10 is a component. Portions of the laser housing walls are shown in FIG. 1 and are designated respectively as 100A and 100B. First nozzle 20 is preferably, and broadly and comparatively speaking, larger than nozzles presently used in the chemical laser art.

Second nozzle 30 is dimensioned and is configurated to continue the supersonic flow of first gaseous reactant 25A. Second nozzle 30 is defined and limited in part by the walls of the housing of the laser, such as laser housing wall portions 100A and 100B.

Each of the plurality of transversely disposed vertical secondary nozzle conduits, such as 41, 42 and 43, is preferably tubular in geometry, with a circular horizontal cross section. Each of the secondary nozzle hollow conduits, such as 43, has a plurality of orifices, such as 43A–43J, inclusive, which are, but need not be, equally spaced in and on the particular hollow conduit, and each of the orifices is preferably, but also need not be, of the same shape and of the same size. The orifices face downstream of horizontally disposed first nozzle 20, of the flow of first gaseous reactant 25A, and of horizontally disposed second nozzle 30. Each of the secondary nozzle hollow conduits, such as 41, 42 and 43, has an inlet, such as respectively 41K, 42K and 43K, into which is introduced a second gaseous reactant and/or a diluent gas, the individual source of each of which is not shown in FIG. 1 in the interest of maintaining simplicity of the drawing, and also because the sources do not comprise any part of this invention. Also not shown in FIG. 1, and for the same reasons, are: the mirrors (or other reflective and/or transmissive components) of the laser of which the nozzle system 10 is a component; the source of the first gaseous reactant 25A; and, all of the housing of the laser which includes nozzle system 10. However, also shown in FIG. 1, are: lasing axis A-B; laser cavity 100C, which includes the mixing region; and, the ("choked") flow of the second gaseous reactant and/or the flow of the diluent gas, with the combined flow shown by arrows which are collectively designated by reference numeral 45B.

B. As to One Embodiment of Conduit

With reference to FIG. 2, therein is shown, in a top plan view, in schematic form, and in cross section a preferred embodiment of a representative one 43 of the plurality of secondary nozzle conduits, such as 41, 42 and 43. The representative secondary nozzle conduit 43 is hollow; is tubular; has a circular cross section; has a plurality of orifices, of which a representative one 43A is shown in cross section in FIG. 2; has an inlet 43K, preferably at the bottom thereof (i.e., of representative conduit 43); and, is transversely positioned (i.e., is vertical).

Also shown in FIG. 2 are: the flow of the first gaseous reactant 25A; the bow shock wave 25B (i.e., the front shock) created by and/or resulting from the supersonic flow of the first gaseous reactant 25A and the presence, positional relationship, and aerodynamic configuration of the downstream-located representative secondary nozzle hollow conduit 43; the subsonic flow area 25C also thereby created; the flow, internally of representative secondary nozzle hollow conduit 43, of the second gaseous reactant 45A; the choked flow 45B of the second gaseous reactant when it 45A is injected, or is otherwise introduced into the flow of the first gaseous reactant; the resultant turbulent breakdown, mixing, reacting (i.e., "combustion") of the first and second gaseous reactants, which is designated generally as 45C, in laser cavity 100C (which includes the mixing region); and, lasing axis A-B.

C. As to Another Embodiment of Conduit

With reference to FIG. 3, therein is shown, in a top plan view, in schematic form, and in cross section, another (i.e., a second) preferred embodiment of a representative one 44 of the plurality of secondary nozzle conduits. This different embodiment 44 is compartmentalized into isolated (from each other) compartments 44M and 44N by a separator or divider 46, with each compartment 44M and 44N having an inlet such as, respectively, 44K and 44L, preferably at the bottom of the compartments. One inlet, such as 44K, permits the inflow of second gaseous reactant 45A into compartment 44M of representative second preferred embodiment of secondary nozzle conduit 44; and, the other inlet, such as 44L, permits the inflow of a diluent gas 47A, which is unreactive (or inert), into compartment 44N of secondary nozzle conduit 44. Embodiment 44 of a typical secondary nozzle conduit has a first plurality of orifices, such as 44A, through which flows second gaseous reactant 45A, and also has a second plurality of orifices, such as 44P – 44T, inclusive, through which flows diluent gas 47A. In all other structural respects, representative conduit 44 is similar to representative conduit 43, FIGS. 1 and 2.

Also shown in FIG. 3 are: the flow of the first gaseous reactant 25A; the bow shock wave 25B of the flow of first gaseous reactant 25A; the subsonic flow area 25C; the resultant turbulent mixing 48 of first gaseous reactant 25A, second gaseous reactant 45A, and diluent gas 47A, and the breakdown and reaction (i.e., "combustion") of the first 25A and second 45A gaseous reactants, in laser cavity 100C (which includes the mixing region); and lasing axis A-B.

MODE OF OPERATION OF THE PREFERRED EMBODIMENTS

The mode of operation of my inventive chemical laser nozzle system, such as 10 which is shown in FIG. 1, whether a plurality of secondary nozzle hollow conduits, such as 43, FIG. 2, or such as 44, FIG. 3, are used, is self-evident and is easily understood from the foregoing description, coupled with reference to the drawings.

Succintly, and with reference to FIGS. 1, 2 and 3, the first gaseous reactant 25A is introduced into the laser housing, of which walls 100A and 100B are portions; the first gaseous reactant 25A passes into first nozzle 20, and then flows through said first nozzle 20 (which is, and can easily be, suitably dimensioned and configurated by one of ordinary skill in the art) at a supersonic speed; flows into and through second nozzle 30 (which similarly is, and can easily be, suitably dimensioned and configurated by one or ordinary skill in the art), impinging upon the particular plurality of secondary nozzle hollow conduits, such as a plurality of hollow conduits similar or identical to 43, or such as a plurality of hollow conduits similar or identical to 44, which are positioned transversely of and to the flow; and a bow shock wave 25B, and a subsonic flow area 25C, are created by and/or as a result therefrom.

If conduits such as 43 are used, the second gaseous reactant 45A is introduced into each conduit of the plurality of conduits, and it 45A is injected, or is otherwise introduced, in turn, into the flow of the first gaseous reactant 25A. A turbulent mixing, breakdown and reaction (i.e., "combustion") occur, such as is generally designated as 45C in FIG. 2, in the laser cavity 100C (which includes the mixing region); and, as a result, the desired lasing action is obtained.

If conduits such as 44 are used, the second gaseous reactant 45A is introduced into a compartment, such as 44M, of the conduit; and, a diluent gas 47A is introduced into another compartment, such as 44N, of the conduit. Second gaseous reactant 45A and diluent gas 47A are injected, or are otherwise introduced, into the flow of the first gaseous reactant 25A. A turbulent mixing, such as is generally designated as 48 in FIG. 3, of first gaseous reactant 25A, second gaseous reactant 45A, and diluent gas 47A results, in laser cavity 100C, with the diluent gas 47A preventing premature "combustion"; and, the breakdown and reaction (i.e., "combustion") of first gaseous reactant 25A and of the second gaseous reactant 45A occurs, also generally designated as 48 in FIG. 3; and, thereby, the desired lasing action is obtained.

CONCLUSION

It is clearly evident from the foregoing description, and from the drawings herein, that all of the objects of our invention have been attained. Therefore, it is not believed necessary to again set forth the objects of our invention, and to show how each and every object has been achieved by, and with the use of, our invention. Suffice it to say that, in addition to the fundamental inventive structural features shown and described, and the objects hereinbefore stated, our invention (while in operation): permits the cooling of the plurality of secondary nozzle hollow conduits, also a desired goal in the art; and, because the flow in and from the first nozzle is supersonic, the problem of premature combustion from secondary nozzle hollow conduit flow feedback, which sometimes occurs in conventional chemical lasers, is eliminated.

In addition, while there have been shown and described the fundamental features of my invention, as applied to two particular preferred embodiments, it is to be understood that various other embodiments, substitutions, additions, omissions, and the like, can be made by those of ordinary skill in the art, without departing from the spirit of our invention. For example, the secondary nozzle hollow conduits are not limited in design or structure; and, they can be of any desired aerodynamic shape.

What we claim is:

1. In a nozzle system for use in a chemical laser having at least one nozzle and in which said chemical laser a first gaseous reactant, a second gaseous reactant, and a diluent gas flow, the improvement comprising a plurality of hollow conduits disposed both in a transverse attitude to said nozzle, and also downstream of said nozzle, wherein each conduit of said plurality of hollow conduits is compartmentalized internally, one compartment having a first plurality of orifices for admitting one of said reactants into said flow, and a second compartment having a second plurality of orifices for introducing said diluent into said flow.

2. The chemical laser nozzle system, as set forth in claim 1, wherein each said conduit of said plurality of hollow conduits is a tube with a circular cross section.

* * * * *